United States Patent
Jorgensen (10) Patent No.: US 8,953,780 B2
(45) Date of Patent: Feb. 10, 2015

(54) PORTABLE ELECTRONIC DEVICE

(71) Applicant: Nokia Corporation, Espoo (FI)

(72) Inventor: Claus H. Jorgensen, Bronshoj (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 14/067,249

(22) Filed: Oct. 30, 2013

(65) Prior Publication Data

US 2014/0073374 A1     Mar. 13, 2014

Related U.S. Application Data

(63) Continuation of application No. 13/741,781, filed on Jan. 15, 2013, now Pat. No. 8,615,077, and a continuation of application No. 12/860,234, filed on Aug. 20, 2010, now Pat. No. 8,363,824, and a continuation of application No. 11/393,510, filed on Mar. 29, 2006, now Pat. No. 7,787,618.

(51) Int. Cl.
    *H04M 1/00*     (2006.01)
    *H04M 9/00*     (2006.01)
    *H04M 1/02*     (2006.01)

(52) U.S. Cl.
    CPC .......... *H04M 1/0264* (2013.01); *H04M 1/0262* (2013.01); *H04M 1/0214* (2013.01); *H04M 1/0277* (2013.01); *H04M 1/0216* (2013.01)
    USPC ............ 379/433.08; 379/433.01; 379/433.13; 455/575.3

(58) Field of Classification Search
    CPC ............ H04M 1/0262; H04M 1/0214; H04M 1/0216; H04M 1/0264; H04M 1/0277
    USPC ............. 379/433.01, 433.08, 433.11, 433.13; 455/90.3, 575.1, 575.3, 572, 573, 574; 361/679.23; 348/374, 376
    See application file for complete search history.

(56) References Cited

U.S. PATENT DOCUMENTS

| 5,537,294 A | 7/1996 | Siwinski | 361/753 |
| 5,541,448 A | 7/1996 | Carpenter | 257/679 |

(Continued)

FOREIGN PATENT DOCUMENTS

| CN | 2750587 Y | 1/2006 |
| EP | 1209880 A2 | 5/2002 |

(Continued)

OTHER PUBLICATIONS

IPod Nano. (Oct. 28, 2013). In *Wikipedia, The Free Encyclopedia.* Retrieved 18:44, Nov. 12, 2013, from http://en.wikipedia.org/w/index.php?title=IPod_Nano&oldid=579129002, 12 pages.

(Continued)

*Primary Examiner* — Tuan D Nguyen
(74) *Attorney, Agent, or Firm* — Harrington & Smith (57) ABSTRACT

A portable electronic device including a first section, a second section and a connecting section. The first section has a user input section and a first tubular housing member. The first tubular housing member forms e majority of opposite exterior lateral sides of the first section. The second section has a display and a second tubular housing member. The second tubular housing member forms a majority of opposite exterior lateral sides of the second section. The connecting section movably connects the second section with the first section. The first tubular housing member at least partially houses the user input section. The second tubular housing member at least partially houses the display.

18 Claims, 6 Drawing Sheets

(56) References Cited

U.S. PATENT DOCUMENTS

| | | | |
|---|---|---|---|
| 5,768,098 A | 6/1998 | Murayama | 361/884 |
| D416,256 S | 11/1999 | Griffin et al. | D14/191 |
| D427,171 S | 6/2000 | Frye et al. | D14/138 |
| 6,075,470 A | 6/2000 | Little et al. | 341/107 |
| 6,128,184 A | 10/2000 | Ito et al. | 361/681 |
| D433,460 S | 11/2000 | Griffin et al. | D21/329 |
| 6,219,257 B1 | 4/2001 | Arnold | 361/814 |
| D445,428 S | 7/2001 | Pattenden | D14/488 |
| 6,271,605 B1 | 8/2001 | Carkner et al. | 307/125 |
| 6,278,442 B1 | 8/2001 | Griffin et al. | 345/169 |
| 6,317,315 B1 | 11/2001 | Lee et al. | 361/681 |
| 6,317,592 B1 | 11/2001 | Campana, Jr. et al. | 455/412 |
| 6,754,507 B2 | 6/2004 | Takagi | 455/550.1 |
| 6,785,395 B1 | 8/2004 | Arneson et al. | 381/334 |
| 6,805,998 B2 | 10/2004 | Jenson et al. | 429/162 |
| D506,476 S | 6/2005 | Andre et al. | D14/496 |
| 6,920,344 B2 | 7/2005 | Jang | 455/575.5 |
| 6,933,981 B1 | 8/2005 | Kishida et al. | 348/375 |
| 7,010,121 B2 | 3/2006 | Wennemer et al. | 379/433.01 |
| 7,046,230 B2 | 5/2006 | Zadesky et al. | 345/156 |
| 7,099,709 B2 | 8/2006 | Hsu et al. | 455/575.8 |
| 7,336,228 B2 | 2/2008 | Lu et al. | 343/702 |
| 7,374,452 B2 | 5/2008 | Kohri et al. | 439/500 |
| 7,495,659 B2 | 2/2009 | Marriott et al. | 345/173 |
| 7,499,040 B2 | 3/2009 | Zadesky et al. | 345/204 |
| 7,515,431 B1 | 4/2009 | Zadesky et al. | 361/752 |
| 7,522,889 B2 | 4/2009 | Wulff et al. | 455/90.3 |
| 7,574,672 B2 | 8/2009 | Jobs et al. | 715/830 |
| 7,627,343 B2 | 12/2009 | Fadell et al. | 455/557 |
| 7,630,741 B2 | 12/2009 | Siddiqui et al. | 455/575.1 |
| 7,860,536 B2 | 12/2010 | Jobs et al. | 455/566 |
| 8,140,133 B2 | 3/2012 | Jung et al. | 455/575.3 |
| 8,353,824 B2 | 1/2013 | Shelton, IV et al. | 600/208 |
| 2001/0034242 A1 | 10/2001 | Takagi | 455/550 |
| 2003/0095656 A1 | 5/2003 | Sommer | 379/419 |
| 2003/0100275 A1 | 5/2003 | Hsu et al. | 455/90 |
| 2003/0199290 A1 | 10/2003 | Viertola | 455/575.1 |
| 2004/0204009 A1 | 10/2004 | Cheng et al. | 455/550.1 |
| 2004/0253508 A1 | 12/2004 | Kohri et al. | 429/100 |
| 2005/0282593 A1 | 12/2005 | Spence et al. | 455/575.3 |
| 2005/0282595 A1 | 12/2005 | Spence et al. | 455/575.3 |
| 2006/0233356 A1 | 10/2006 | Lu et al. | 379/433.01 |

FOREIGN PATENT DOCUMENTS

| | | |
|---|---|---|
| EP | 1209880 A3 | 2/2003 |
| EP | 1 617 313 A2 | 1/2005 |
| EP | 1496672 A1 | 1/2005 |
| EP | 133983 A1 | 5/2005 |
| EP | 1496672 A1 | 1/2006 |
| EP | 2472833 A1 | 7/2012 |
| GB | 2 383 472 A | 6/2003 |
| GB | 2383472 A | 6/2003 |
| GB | 2391740 A | 2/2004 |
| JP | 11-331333- | 11/1999 |
| JP | 2000133973 A | 5/2000 |
| JP | 2001007550 A | 1/2001 |
| JP | 2001308992 A | 11/2001 |
| JP | 2005-318064 A | 11/2005 |
| WO | WO-95/31048 A1 | 11/1995 |
| WO | WO 2007/110771 A2 | 10/2007 |

OTHER PUBLICATIONS

IPod Mini. (Oct. 28, 2013). In *Wikipedia, The Free Encyclopedia*. Retrieved 18:47, Nov. 12, 2013, from http://en.wikipedia.org/w/index.php?title=IPod_Mini&oldid=579128730, 4 pages.

Nokia 9300 specifications, Nokia 9300 announcement: 2004, Nokia 9300 launched 2004-2005, retrieved Nov. 12, 2013 from http://www.gsmarena.com/nokia_9300-881.php, 1 page.

Photographic image of Nokia 9300 with cover removed, Nokia 9300 announcement: 2004, Nokia 9300 launched 2004-2005, 1 page.

Wilson, Tracy V., "How a Blackberry Works", howstuffworks.com, 4 pages, Jan. 2006, retrieved Aug. 26, 2013, 4 pages.

Gabe, "Installing Palm Zire 31 Battery", www.iFixit.com, document generated Aug. 24, 2013, Palm Zire 31 first released Apr. 2004, 6 pages.

Fadell, Tony, "Apple seriously considered building an iPhone with hardware keyboard", MAC Daily News, Apr. 30, 2012, 13 pgs.

"Getting Started", Zire™ 31, Palm One, Inc., 2003, 104 pgs.

"palmOne Zire 31 Review", Brighthand Smartphone News & Review, Apr. 27, 2004, 4 pgs.

"Repairing TomTom ONE Back Cover", Fixit, 2003, 4 pgs.

"Sendo M550 Manual, CE0168" Sendo, 2003, 50 pgs.

"User Guide for the Kyocera SoHo Phone", Kyocera 82K5867-1EN, Rev. 002, 2004, 59 pgs.

"Sprint PCS Vision Phone VI-3155i by okia", Sprint PCS® Service, Sprint 2005, 208 pgs.

"The Birth of the iPhone—Excerpt from Jony Ive: The Genius Behind Apple's Greatest Products", Kahney, Leander, Jan. 7, 2014, 30 pgs.

"Motomanual V176 GSM", Motorola, 2006, 77 pgs.

Operating Instructions X800 Symbian OS Smartphone, Panasonic, 2005, 194 pgs.

"Meet the Nokia N72: the Multimedia Computer that Looks as Good as It Performs", Press Release, Apr. 2006, 2 pgs.

"Microsoft and Nokia Collaborate to Help Ensure Consumers Can Enjoy Digital Music Anywhere", Press Release, Feb. 14, 2005, 2 pgs.

"Multifuntional Mobiles Make the World Go Round", Press Release, Jun. 6, 2006, 4 pgs.

"Nokia 3250: A music phone with a twist", Press Release, Sep. 27, 2005, 2 pgs.

"Nokia Announces Convergence Devices for Mobile TV and the Digital Home at Nokia Mobility Conference 2005", PRNewswire, Barcelona, Spain, 2005, 3 pgs.

"Nokia Launches Mobile Music Solution for Operators Worldwide", Nexus 5, Feb. 14, 2005, 3 pgs.

"Nokia N90 voted European Media Phone of the Year", Press Release, Aug. 16, 2005, 2 pgs.

"The world's first integrated DVB-H mobile device makes prime time any time", Press Release, Nov. 2, 2005, 3 pgs.

"Two Nseries multimedia devices receive prestigious commendation from Popular Science magazine", Press Release, Nov. 8, 2005, 3 pgs.

"Part of the Nokia Nseries high performance multimedia range, the Nokia N90 brings Carl Zeiss optics into the mobile arena", Press Release, Apr. 27, 2005, 4 pgs.

Blackberry 857—Enterprise Edition—Blackberry Series Specifications, Blackberry 857 launched Nov. 2000, document retrieved May 30, 2014 from http://www.cnet.com/products/blackberry-857-enterprise-edition-blackberry-series/, 3 pages.

Blackberry 957—Enterprise Edition—Blackberry—5MB Series Specifications, Blackberry 957 launched Nov. 2000, document retrieved May 30, 2014 from http://www.cnet.com/products/blackberry-957-internet-edition-blackberry-series/, 2 pages.

Zire 31. (Dec. 20, 2013). In Wikipedia, The Free Encyclopedia. Retrieved 14:47, May 30, 2014, from http://en.wikipedia.org/w/index.php?title=Zire_31&oldid=586990828, 3 pages.

Zire 72. (Mar. 12, 2013). In Wikipedia, The Free Encyclopedia. Retrieved 14:49, May 30, 2014, from http://en.wikipedia.org/w/index.php?title=Zire_72&oldid=543613308, 3 pages.

Motorola Razr. (May 29, 2014). In *Wikipedia, The Free Encyclopedia*. Retrieved 14:52, May 30, 2014, from http://en.wikipedia.org/w/index.php?title=Motorola_Razr&oldid=610567906, 12 pages.

Jony Ive : the genius behind Apple's greatest products [Summary], Book published Nov. 2013, Summary retrieved May 30, 2014, from http://lccn.loc.gov/2013037927, 2 pages.

Photographic images of iPod Mini with cover removed, iPod Mini announcement: Jan. 6, 2004, iPod Mini released on Feb. 20, 2004, 1 page.

Photographic images of PalmOne Zire 31 (front/back, and with cover removed), Palm One Zire 31 released: Apr. 2004, 1 page.

Photographic images of iPod Nano (front/back, and with cover removed), iPod Nano released: Sep. 2005, 1 page.

Photographic images of Nokia 9300 (front/back, and with cover removed), Nokia 9300 announcement: 2004, Nokia 9300 launched 2004-2005, 1 page.

"LG© LX-225 Phone Guide", LG Life's Good, 2004, 208 pgs.

(56) References Cited

OTHER PUBLICATIONS

"i560 Phone User's Guide", Motorola iDEN Digital Multi-service Data-capable Phone, 2005, 155 pgs.
"Motorola V3 GSM User Guide", 2005, 34 pgs.
"Motorola V3-RAZR Repair Manual", Apr. 2005, 33 pgs.
"Nokia 3155 Use Guide", 2005, 95 pgs.
"Nokia 3155, Nokia 3155i, and Nokia 3152 User Guide", 2005, 201 pgs.
"Nokia 6101 and Nokia 6102 User Guide", 2005, 87 pgs.
"Nokia USA Launches 3155 CDMA Folder", Oryl, Michael, Mar. 15, 2005, 1 pgs.
"O2X3™—How to use it", O2 (UK) Limited, Aug. 2004, 125 pgs.
"O2X4™—How to use it", O2 (UK) Limited, Mar. 2005, 118 pgs.
"Nokia 3155/3155i, 3152 (RM-61) Schematics—Main PWB, Version 1, Edit 247", Nokia Customer Care, 2005, 30 pgs.
"And Then Steve Said, 'Let there Be an iPhone'", The New York Times, Oct. 4, 2013, 12 pgs.
"BT Zenith Flip-Issue 1-Edition 04, User Guide", Aug. 9, 2005, 88 pgs.
"User Guide for the Kyocera Candid KX16 Phone, 82-N8302-1EN, Rev.001", Kyocera Wireless Corp., 2005, 64 pgs.
"Digital Wireless Telephone User's Guide", Motorola, 2002, 106 pgs.
"Handbook for Palm™ Zire™ Handheld", Palm Inc., 2002, 208 pgs.
"Handsets look to eclipse cameras", BBC News, Jun. 6, 2006, 2 pgs.
"Hands-on with Motorola's RAZR V3 for Cingular", Nelson, Adam, Engadget, Dec. 6, 2004, 10 pgs.
"How a BlackBerry Works", Wilson, Tracy V., http://electronics.howstuffworks.com/blackberry.htm/printable, Jan. 7, 2014, 4 pgs.
"i930 Phone User's Guide", Nextel iDEN Digital Multi-serice Data-capable Phone, Microsoft, 2005, 194 pgs.
"C3300 User Guide CE0168", LG Life's Good, Feb. 20, 2005, 99 pgs.
"User Guide for the Kyocera Milan KX9B/KX9C Phones 82-N8274-1EN, Rev. 002", Kyocera, 2005, 63 pgs.
Complainants' Nokia Corporation, Nokia Inc.'s Opening Claim Construction Brief (Jonas R. McDavit et al.) [including Exhibits 1-29 and Certificate of Service], Investigation No. 337-TA-885, Sep. 16, 2013 (787 pages).
Exhibit C-1: Invalidity of U.S. Patent No. 8,363,824 in light of United States Patent No. 7,515,431 to Stephen P. Zadesky, et al. ("Zadesky"), HTC Corp. and HTC America, Inc., Oct. 11, 2013, 11 pages.
Exhibit C-2: Invalidity of U.S. Patent No. 8,363,824 in light of United States Patent No. 7,336,228 to Lin Lu, et al. ("Lu") , HTC Corp. and HTC America, Inc., Oct. 11, 2013, 8 pages.
Exhibit C-3: Invalidity of U.S. Patent No. 8,363,824 in light of United States Patent Application Publication No. US 2005/0282593 to Michael F. Spence, et al. ("Spence"), HTC Corp. and HTC America, Inc., Oct. 11, 2013, 8 pages.
Exhibit C-4: Invalidity of U.S. Patent No. 8,363,824 in light of PalmOne Zire 31 and U.S. Patent No. 7,366,228 to Lu, HTC Corp. and HTC America, Inc., Oct. 11, 2013, 11 pages.
Exhibit C-5: Invalidity of U.S. Patent No. 8,363,824 in light of Apple iPod Nano (1st Generation), HTC Corp. and HTC America, Inc., Oct. 11, 2013, 11 pages.
Exhibit C-6: Invalidity of U.S. Patent No. 8,363,824 in light of Apple iPod Mini (1st Generation), HTC Corp. and HTC America, Inc., Oct. 11, 2013, 9 pages.
Exhibit C-7: Invalidity of U.S. Patent No. 8,363,824 in light of Nokia 9300, HTC Corp. and HTC America, Inc., Oct. 11, 2013, 13 pages.
Exhibit C-8: Invalidity of U.S. Patent No. 8,363,824 in light of Blackberry 857, HTC Corp. and HTC America, Inc., Oct. 11, 2013, 11 pages.
Proposed Constructions for Claim Terms of U.S. Patent No. 6,035,189, U.S. Patent No. 6,373,345, U.S. Patent No. 6,711,211, U.S. Patent No. 7,187,945, U.S. Patent No. 8,140,650, U.S. Patent No. 8,363,824, and U.S. Patent No. 7,366,529 (Paul C. Goulet et al.) [including Declaration of Iain Richardson (with Exhibits A, B) and Certificate of Service], Investigation No. 337-TA-885, Sep. 9, 2013 (35 pages).
Complainants Nokia Corporation and Nokia Inc.'s Proposed Claim Constructions and Identification of Extrinsic Evidence (Jonas R. McDavit et al.) [including Proposed Claim Constructions and Identification of Extrinsic Evidence and Certificate of Service], Investigation No. 337-TA-885, Sep. 9, 2013 (12 pages).
Joint Claim Construction Chart (Jonas R. McDavit et al.) [including Joint Claim Construction Chart and Certificate of Service], Investigation No. 337-TA-885, Sep. 13, 2013 (15 pages).
HTC Corporation, HTC America, Inc., and Google Inc.'s Initial Claim Construction Brief for U.S. Patent No. 6,035,189; U.S. Patent No. 6,711,211; and U.S. Patent No. 8,140,650 (Shamita D. Etienne-Cummings et al.) [including Exhibits 1-11 and Certificate of Service], Investigation No. 337-TA-885, Jan. 8, 2013 (255 pages).
Respondents' Initial Markman Brief Regarding Disputed Claim Terms In U.S. Patent Nos. 6,373,345, 7,187,945, 8,363,824, and 7,366,529 (Paul C. Goulet et al.) [including Exhibits 1-24 and Certificate of Service], Investigation No. 337-TA-885, Sep. 16, 2013 (400 pages).
Respondents HTC Corporation's and HTC America, Inc.'s (1) Initial Supplemental Responses To Complainants' Contention Interrogatories To HTC (Nos. 9, 11, 12, 14, 52, and 53) and (2) Initial Objections and Responses To Complainants' Contention Interrogatories to HTC (Nos. 54-56) (Paul C. Goulet et al) [including Certificate of Service], Investigation No. 337-TA-885, Oct. 11, 2013 (11 pages).
Google Inc.'s Initial Claim Construction Brief (Shamita D. Etienne-Cummings et al.) [including Exhibits 1-32 and Certificate of Service], Investigation No. 337-TA-847, Dec. 20, 2012 (690 pages).
Respondents HTC Corp. and HTC America, Inc's, Opening Claim Construction Brief (Blair M. Jacobs et al.) [including Exhibits 1-19 and Certificate of Service], Investigation No. 337-TA-847, Dec. 20, 2012 (371 pages).
Complainants' Nokia Corporation, Nokia Inc., and Intellisync Corporation, Opening Claim Construction Brief (Jason Berrebi et al.) [including Exhibits A-D and Certificate of Service], Investigation No. 337-TA-847, Dec. 20, 2012 (106 pages).
Google Inc.'s Reply Brief on Construction of Disputed Terms of U.S. Patent No. 6,141,664, U.S. Patent No. 7,209,911, U.S. Patent No. 5,884,190, and U.S. Patent No. 7,366,529 (Shamita D. Etienne-Cummings et al.) [including Exhibits 33-37 and Certificate of Service], Investigation No. 337-TA-847, Jan. 8, 2013 (151 pages).
Complainants' Nokia Corporation, Nokia Inc., and Intellisync Corporation Responsive Claim Construction Brief (Jason Berrebi et al.) [including Certificate of Service], Investigation No. 337-TA-847, Jan. 8, 2013 (48 pages).
Respondents HTC Corp. and HTC America, Inc.'s Responsive Claim Construction Brief(Blair M. Jacobs et al.), Investigation No. 337-TA-847, executed Jan. 8, 2013 (17793 pages).
Google Inc.'s Notice of Prior Art (Shamita D. Etienne-Cummings et al.) [including Certificate of Service], Investigation No. 337-TA-885, Dec. 24, 2013 (38 pages).
Respondents' Rebuttal Markman Brief Regarding Disputed Claim Terms in U.S. Patent Nos. 6,373,345; 7,187945; 8,363,824; and 7,366,529 (Paul C. Goulet et al.) [including Exhibits 1-34 and Certificate of Service], Investigation No. 337-TA-885, Sep. 23, 2013 (548 pages).
HTC Corp., HTC America, Inc., and Google Inc.'s Rebuttal Claim Construction Brief forU.S. Patent No. 6,035,189, U.S. Patent No. 6,711,211, and U.S. Patent No. 8,140,650 529 (Shamita D. Etienne-Cummings et al.) [including Exhibits 1-11, 16-19 and Certificate of Service], Investigation No. 337-TA-885, Sep. 23, 2013 (281 pages).
Proposed Terms for Claim Construction of U.S. Patent No. 6,035,189, U.S. Patent No. 6,373,345, U.S. Patent No. 6,711,211, U.S. Patent No. 7,187,945, U.S. Patent No. 8,140,650, U.S. Patent No. 8,363,824 and U.S. Patent No. 7,366,529 (Paul C. Goulet et al.) [including Certificate of Service], Investigation No. 337-TA-885, Sep. 23, 2013 (7 pages).
Complainants Nokia Corporation and Nokia Inc.'s Responsive Claim Construction Brief (M. Scott Stevens et al.) [including Exhibits 1-36 and Certificate of Service], Investigation No. 337-TA-885, Sep. 23, 2013 (983 pages).

PORTABLE ELECTRONIC DEVICE

CROSS REFERENCE TO RELATED APPLICATION

This is a continuation patent application U.S. patent application Ser. No. 13/741,781 filed Jan. 15, 2013, which is a continuation patent application of U.S. patent application Ser. No. 12/860,234 filed Aug. 20, 2010, now U.S. Pat. No. 8,363,824, which is a continuation patent application of U.S. patent application Ser. No. 11,393,510 filed Mar. 29, 2006, now U.S. Pat. No. 7,787,618.

BACKGROUND OF THE INVENTION

1. Field of the Invention

The invention relates to a portable electronic device and, more particularly, to form factor configuration of a portable electronic device.

2. Brief Description of Prior Developments

Ultra thin telephone products have emerged in the market, pioneering new approach in mechanical architecture for flip-phone designs (also known a clam-shell handset). Priority for these products is mechanical thinness, allowing the feature set and industrial design to be adjusted to suit this goal. New flip-phones include the Motorola RAZR, the Motorola V3, the Motorola V3x, the Samsung SCH-V740, the NEC L1. For example, the Motorola RAZR has a thickness of about 0.54 inch. Candy-bar shaped mobile phones can have smaller thicknesses, such as the Motorola SLIVR with a thickness of about 0.45 inch and the Motorola SCALPEL with a thickness of about 0.25 inch.

There is a desire for an architecture for an ultrathin fold product, such as a flip-phone style of mobile telephone, which can maintain aesthetic balance in proportions, and allow added thickness to avoid a "squeezed" appearance as seen with the RAZR™ mobile telephone.

SUMMARY OF THE INVENTION

In accordance with one aspect of the invention, a portable electronic apparatus is provided comprising a first section comprising electronics; a second section movably connected to the first section by a binge section, wherein the second section comprises a display; and an access entry provided in the hinge section adapted to allow insertion of an electrical device through the hinge section and into electrical connection with an electrical connector inside the first section.

In accordance with another aspect of the invention, a portable electronic device is provided including first section, a second section and a connecting section. The first section has a user input section and first tubular housing member. The first tubular housing member forms a majority of opposite exterior lateral sides of the first section. The second section has a display and a second tubular housing member. The second tubular housing member forms a majority of opposite exterior lateral sides of the second section. The connecting section movably connects the second section with the first section. The first tubular housing member at least partially houses the user input section. The second tubular housing member at east partially houses the display.

In accordance with another aspect of the invention, a mobile telephone is provided comprising an engine section comprising a printed circuit board, a transceiver, a processor and a memory; a battery located adjacent the engine section; and a user input section comprising a keypad located directly above the engine section and the battery. The user input section is located directly opposite the battery without a portion of the engine section therebetween.

In accordance with another aspect of the invention, a portable electronic device is provided comprising a first section; a second section movably connected to the first section by a hinge; and a camera. The hinge comprises a first hinge member connected to the first section and a second hinge member connected to the second section. The camera is connected to the second section. The camera is housed at an exterior side of the portable electronic device by a junction of a portion of the second hinge member and a portion of an exterior housing of the second section.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
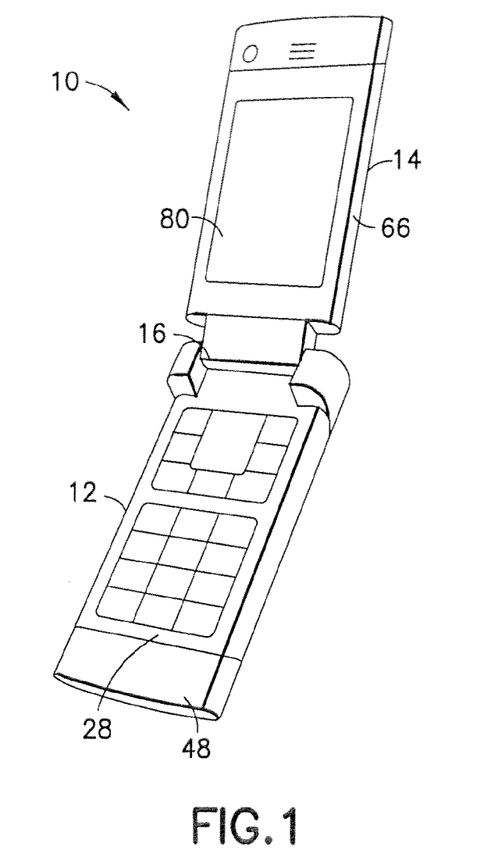
FIG. 1 is a perspective view of a mobile telephone comprising features of the invention.

Referring to FIG. 1, there is shown a perspective view of a portable electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 2:
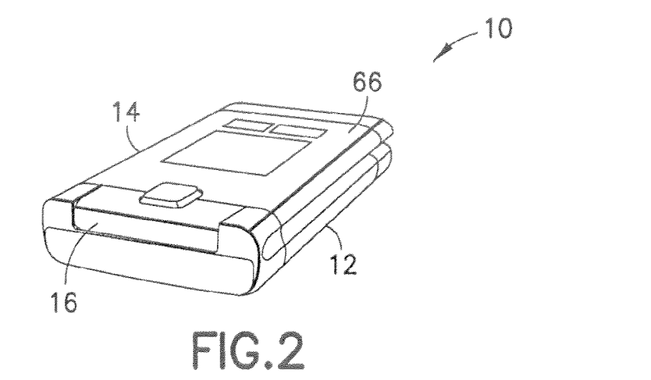
FIG. 2 is a perspective view of the telephone shown in FIG. 1 is a closed configuration.
Figure 3:
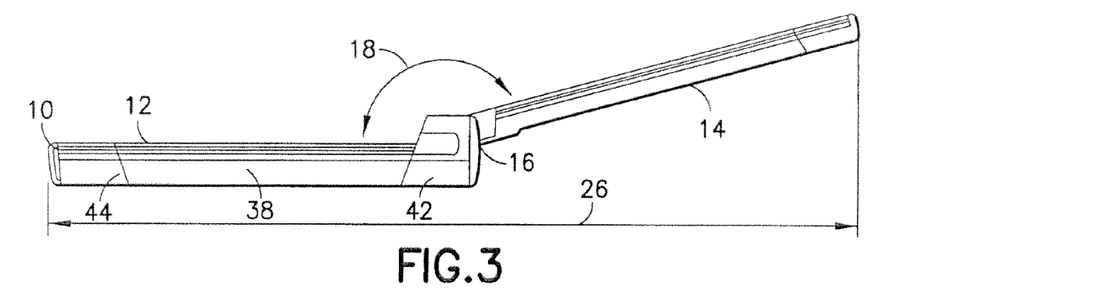
FIG. 3 is a side view of the telephone shown in FIG. 1.
Figure 4:
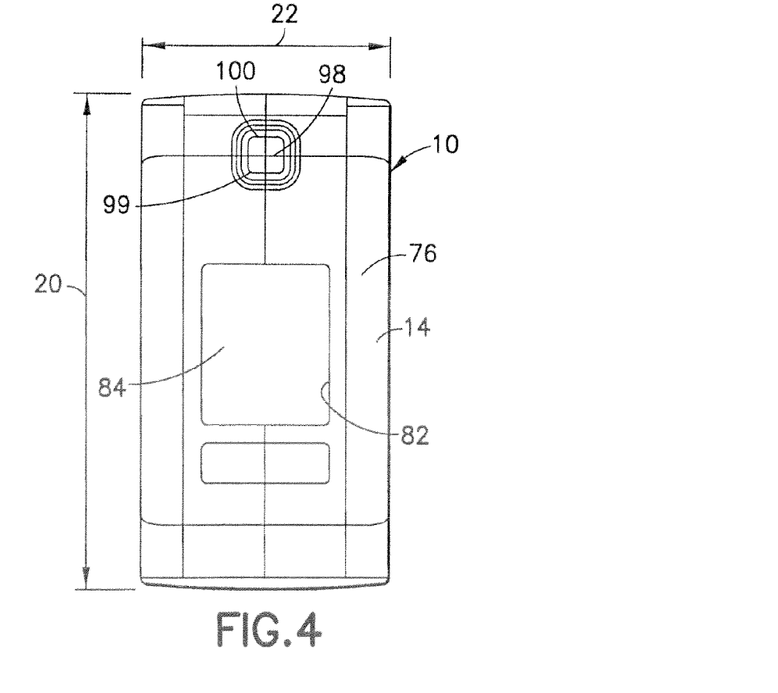
FIG. 4 is a front view of the telephone shown in FIG. 2.
Figure 5:
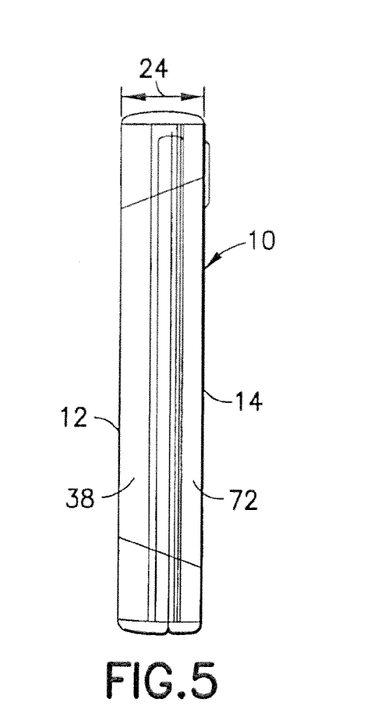
FIG. 5 is a side view of the telephone shown in FIG. 2.
Figure 6:
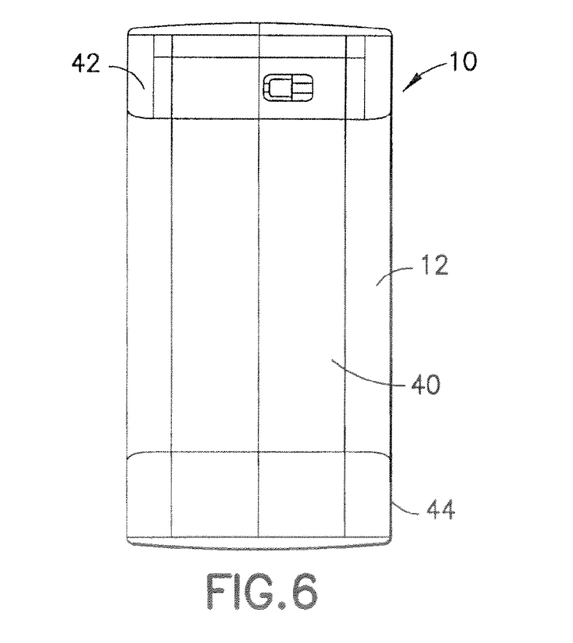
FIG. 6 is a rear view of the telephone shown in FIG. 2.

In the embodiment shown, the device 10 comprises a hand-held mobile telephone. However, in alternate embodiments, features of the invention could be used in other types of portable electronic devices, such as a PDA or a hand-held gaming device for example. The telephone 10 is a flip-phone type of telephone comprising a first section 12 connected to a second section 14 by a movably connecting section 16. In this embodiment the connecting section 16 is a hinge. However, in alternate embodiments, any suitable type of movable connecting section could be provided. FIG. 1 shows the telephone 10 in an open configuration. FIG. 2 shows the telephone 10 in a closed configuration.

Referring also to FIGS. 3-6, in the closed configuration, the second section 14 lies directly opposite the first section 12. The hinge 16 allows the second section 14 to pivot open to the open configuration at an angle 18 of about 165°. However, in alternate embodiments, the angle 18 could have any suitable angle. In the closed configuration, the telephone has a height 20 of about 88.7 mm, a width 22 of about 45 mm, and a thickness 24 of about 15 mm. In the open configuration, the telephone has a length 26 of about 166 mm. However, in alternate embodiments, any suitable dimensions could be provided. As seen with reference to FIG. 3, the design shown has a substantially uniform thickness lower section 12 and a substantially uniform thickness upper section 14 along their entire lengths except for at the hinge 16. As seen best in FIGS. 5 and 14, when the two sections 12, 14 are closed, the telephone 10 has a block shape with grooves along the joints at the lateral sides, but with the ends of the sections 12, 14 being at the same bottom end of the closed shape.

Figure 7:
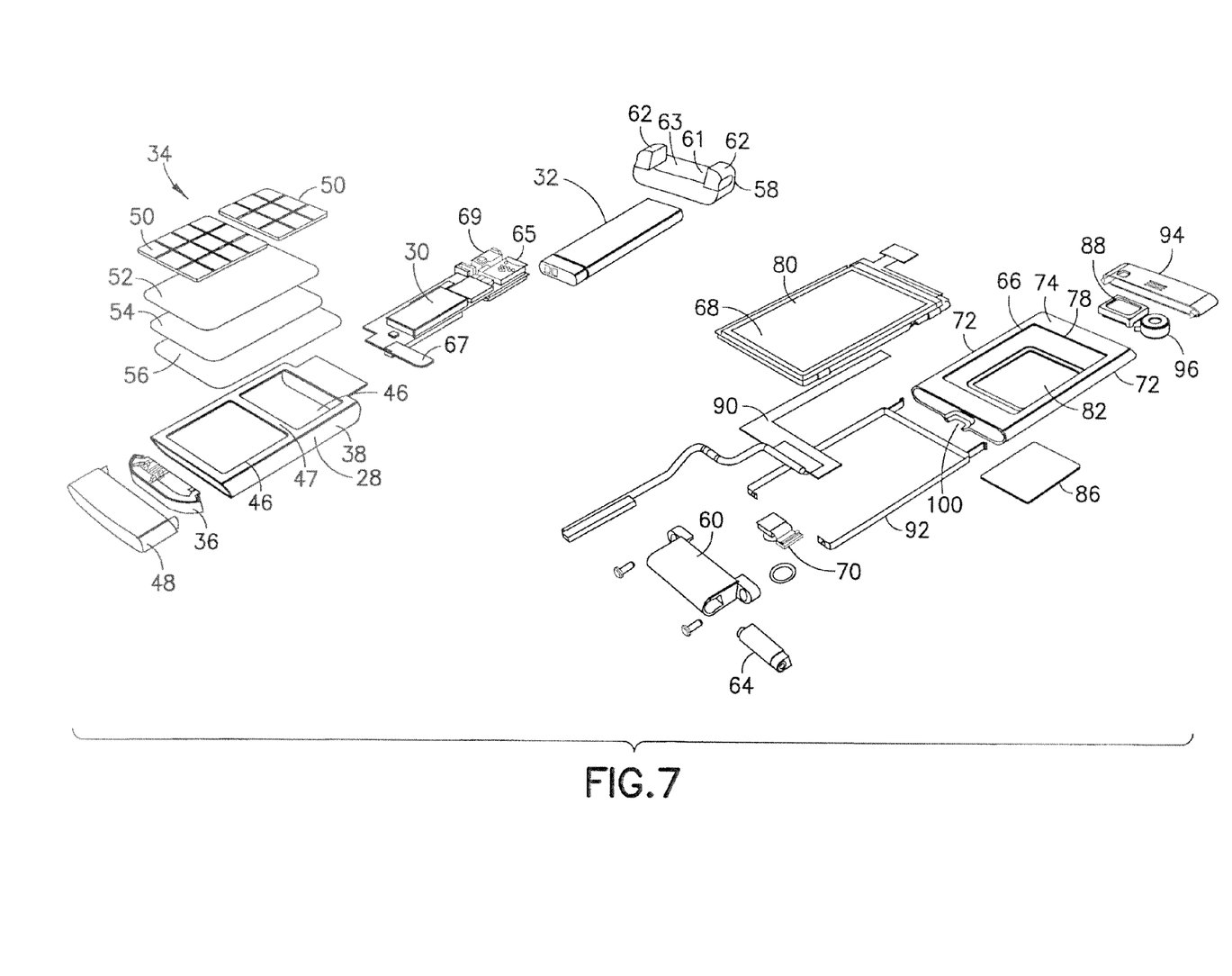
FIG. 7 is an exploded perspective view of the telephone shown in FIGS. 1-6.

Referring also to FIG. 7, there is shown an exploded perspective view of the telephone 10 for details of how the small thickness 24 of about only 15 mm in a flip-phone design can be accomplished. The first section 12 generally comprises a first housing member 28, an engine 30, a battery 32, a user input section 34, and an antenna module 36. Additional components could be provided. The first housing member 28 generally comprises a one-piece tubular member. In a preferred embodiment, the tubular member is comprises of metal, such as aluminum for example. In one type of embodiment, the tubular metal member could be formed from an extruded member with holes punched into it after it is extruded. The first housing member 28 forms a majority of opposite exterior lateral sides 38 and rear side 40 of the first section 12 (except at top and bottom ends 42, 44 of the first section). The front side of the first housing member 28 has holes 46 therethrough for portions of the user input section 34 to be located in the holes. Because of the tubular shape of the first housing member 28, the first housing member 28 has substantially open top and bottom apertures, which are slanted in the embodiment shown.

The antenna module 36 is located at the bottom aperture into the first housing member 28 and enclosed by the antenna cover 48. The antenna cover 48, such as made of plastic, is attached to the first housing member 28 at the bottom aperture to keep the antenna module 36 attached to the rest of the telephone. In one type of embodiment, the antenna module could be a STINGRAY antenna from RaySat, Inc. However, any suitable antenna module could be provide.

The user input section generally comprises keymats 50, an EL backlight foil 52, a keymat dome sheet 54 and a keymat stiffener 56. However, in alternate embodiments, any suitable user input section could be provided. The keymats 50 are located in the holes 46 of the first housing member 28. The other components of the user input section are located inside the first housing member 28. A cross bar portion 47 of the first housing member 28 is located between the two keymats 50.

Figure 8:
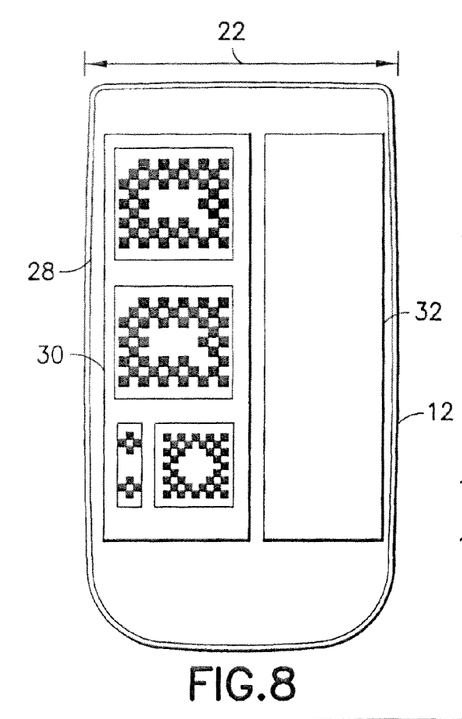
FIG. 8 is a schematic view showing the layout of the engine and the battery of the telephone shown in FIGS. 1-7.

The engine 30 generally comprises a printed circuit board, a transceiver, a processor, and a memory, among other components. Referring also to FIG. 8, the width of the engine 30 is only about less than half the width 22 of the telephone. The battery 32 is located adjacent the lateral side of the engine 30 and is also about less than half the width 22 of the telephone. Unlike conventional telephones which have the engine located above the battery, the configuration of the side-by-side engine/battery allows the battery and the engine to have a practical design thickness and still provide a reduced thickness 24 as compared to conventional flip-phones. The keypads are located above the engine section 30 and the battery 32, wherein the user input section 34 is located directly opposite the battery 32 without a significant portion of the engine section 30 therebetween.

The connecting section 16 has a first hinge member 58 and a second hinge member 60. The first hinge member 58 is connected to the top end of the first frame member 28 to substantially close the open top end of the first frame member 28. The first hinge member 58 also comprises a door 61 for access to the battery 32 such that the battery can be removed, and a door 63 for access to the engine 30 for inserting and removing an electronic module 65, such as a SIM card or flash memory or other memory card. The doors 61, 63 are located below the shoulders 62 such that there is a path at the connecting section 16 past the second hinge member 60. In an alternate embodiment, the connecting section 16 could have only one door; for the battery or for the electronic module or both. The door(s) is preferably connected to the rest of the first hinge member 58 by a living hinge. However, in alternate embodiments any suitable type of doorway system could be provided. In other alternate embodiments any suitable access entry could be provided. In a preferred embodiment the door(s) support the electronic device (such as the battery 32 and/or electronic module 65). The engine 30 comprises electrical connectors 67 and 69 for the electronic devices 32 and 65 to connect to inside the first section 12.

The first hinge member 58 has shoulders 62 with interior facing apertures to receive ends of the hinge module 64. The hinge module 64 is mounted in the second hinge member 60. The second hinge member 60 is sized and shaped to pivotably fit between the shoulders 62. In an alternate embodiment any suitable type of hinge assembly could be provided, such as disclosed in U.S. Pat. No. 6,900,981, and U.S. patent application Ser. Nos. 10/610,987, 11/055,914, 11/077,674, and 11/253,017, for example, which are hereby incorporated by reference in their entireties. In an alternate embodiment, the electronic device insertion and removal feature through a movable connection section of the invention could be used in other types of telephones having movable sections including, for example, a slide phone such as shown in U.S. Pat. No. Des. 427,171 which is hereby incorporated by reference in its entirety, or could be used in other apparatus, such as a gaming device or PDA having two movable sections connected by a hinge or connecting section.

The second section 14 generally comprises a second housing member 66, a display module 68 and a cameral 70. The second housing member 66 preferably comprises a one-piece member having a general tubular shape. In a preferred embodiment, the tubular member is comprises of metal, such as aluminum for example. In one type of embodiment, the tubular metal member could be formed from an extruded member with holes punched into it after extrusion. The second housing member 66 forms portions of opposite exterior lateral sides 72, a front side 74 and a rear side 76 of the second section 14. The front side of the second housing member 66 has a hole 78. A front portion 80 of the display module 68 can be located for viewing through the hole 78. The rear side of the second housing member 66 has a hole 82 therethrough. A rear portion 84 (see FIG. 4) of the display module 68 is located for viewing through the hole 82. Front portion 80 forms a main display, and rear portion 84 forms a sub-display. A window 86 can be glued onto the sub-display 84. Because of the tubular shape of the second housing member 66, the second housing member 66 has substantially open top and bottom apertures, which are slanted in the embodiment shown.

The display module 68, camera 70 and a speaker or sound transducer 88 are coupled to the engine 30 by a flex cable assembly 90 which extends through the hinge 16. A mounting bracket 92 is provided for mounting the display module 68 inside the second housing member 66 between the second hinge member 60 and a speaker cover 94 at opposite ends of the second housing member 66. An optional second camera 96 could also be provided.

The camera 70 extends to the rear side 76 of the second section 14. The camera 70 is housed at an exterior side of the portable electronic device by a junction 98 of a cutout portion 99 of the second hinge member 60 and a cutout portion 100 of the second tubular housing member 66. The cutout portions 99, 100 project slightly from the rear side of the telephone to form a protrusion 142 (see FIG. 14). by providing a projecting portion of the housing for the camera, rather than making the housing flush with the camera, this allows the rest of the telephone to have the reduced thickness 24, but still use a standard size camera.

Figure 9:
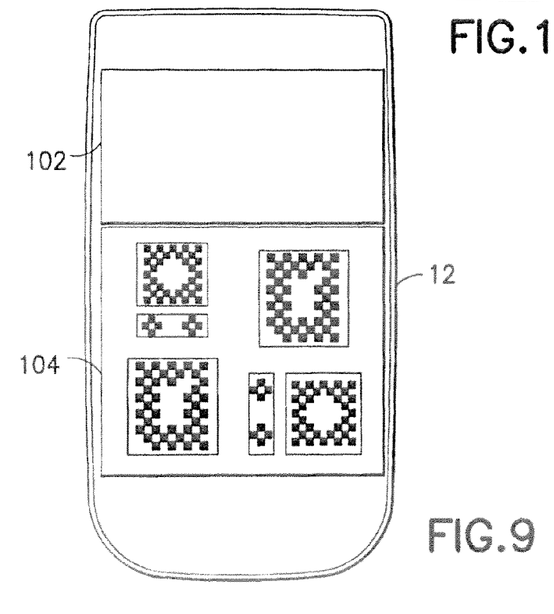
FIG. 9 is a schematic view similar to FIG. 8 showing an alternate embodiment of the layout of the engine and the battery.
Figure 10:
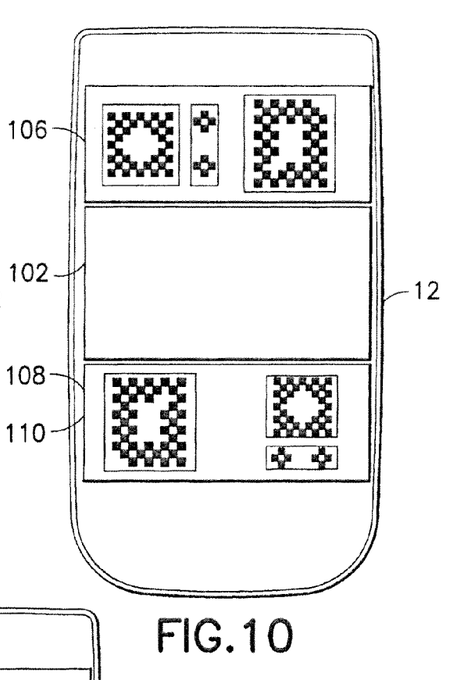
FIG. 10 is a schematic view similar to FIG. 8 showing another alternate embodiment of the layout of the engine and the battery.
Figure 11:
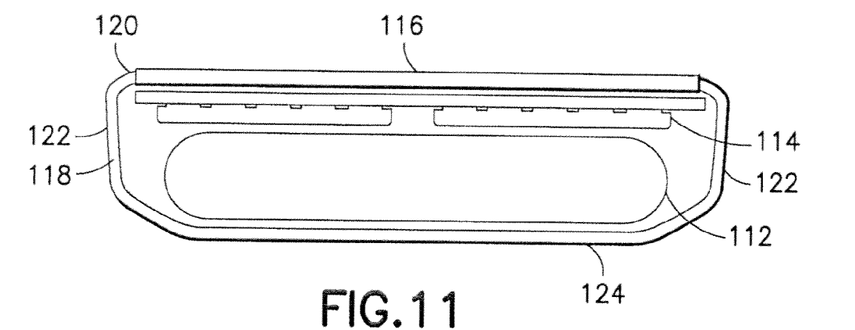
FIG. 11 is a schematic view showing an alternate embodiment of the layout of the engine and the battery.

Referring also to FIGS. 9-10, alternate embodiments of configuration of the battery relative to the engine of FIG. 8 is shown. FIG. 10 shows an embodiment where the battery 102 and engine 104 are located in the first section 12 in a side-by-side configuration. This side-by-side configuration comprises the battery 102 being located at a top side of the engine 104 proximate the hinge end of the first section. FIG. 11 shows an embodiment where the battery 102 is located between two portions 106, 108 of the engine 110. Thus a split side-by-side configuration is provided. In both of these alternate embodiments the keypad is located above the engine section and the battery, wherein the user input section is located directly opposite the battery without a substantial portion of the engine section therebetween.

Figure 12:
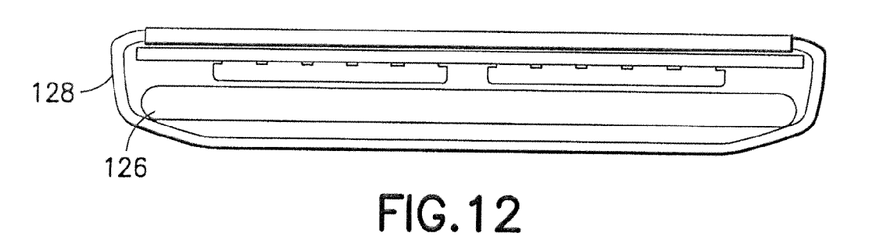
FIG. 12 is a schematic view similar to FIG. 11 showing an alternate embodiment of the layout of the engine and battery.
Figure 13:
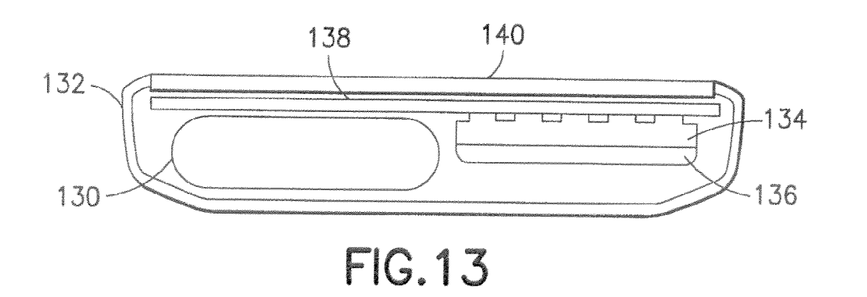
FIG. 13 is a schematic view similar to FIG. 11 showing an alternate embodiment of the layout of the engine and the battery.

FIGS. 11-13 show other alternate embodiments of positioning the battery relative to the engine. In FIG. 11 the battery 112 is located below the engine 114. The keypad 116 is located above the engine 114. The components 112, 114, 116 are housed in one-piece metal tubular housing member 118. The keypad is located at a hole through the front side 120 of the housing member 118. Otherwise, the housing member 118 forms enclosed lateral exterior sides 112 and rear side 124.

FIG. 12 shows an embodiment similar to FIG. 11. However, in this embodiment the battery 126 is thinner and wider than the battery 112. The tubular housing member 128 is thinner and wider than the tubular housing member 118. FIG. 13 shows another alternate embodiment. In this embodiment the battery 130 is about half the width of tubular housing member 132. The engine 134 comprises a portion 136 located at the lateral side of the battery 130 and another portion 138 located between the battery and the keypad 140. The configurations shown in FIGS. 11-13 could be used in candy-bar style telephone handsets as well as flip-phone style handsets.

One of the features of the invention is the use of tubular members to form the major housing components of the first and second sections of the flip-phones. The tubular housing members provide an increased strength than conventional housing designs. This allows the reduction in side of the housing components versus conventional housing components and, thus, a reduction in the thickness 24 of the telephone. In addition, the side-by-side positioning of the battery/engine can further allow a reduction in thickness of the handset versus conventional stacked battery/engine handsets.

With the present invention a user exchangeable battery and/or cards (SIM, flash and other memory cards) can be inserted and removed through the hinge end in a portable terminal. The housing of a fold phone can be extruded in one material. Extruding a housing in one material and having a user exchangeable battery (and cards) through a hinge end can be provided. With the invention a battery can be located next to the PWB on a lateral side of the phone.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A portable electronic device comprising:
    a one piece housing forming enclosed exterior lateral sides and a rear side;
    a cut out in the rear side of said housing;
    a camera located in said housing and extending to said cut out at said rear side;
    an engine section comprising a printed circuit board, a transceiver, a processor and a memory;
    a user input section located above the engine section and a battery, wherein the user input section is located adjacent the battery and the engine section;
    wherein the battery and engine section are housed in the housing and the user input is located in a hole through a front side of the housing.

2. A portable electronic device according to claim 1 wherein said one piece housing has a front side extending from and between the lateral sides.

3. A portable electronic device according to claim 2 wherein the front side extends parallel to the lateral edges.

4. A portable electronic device according to claim 3 wherein the front side forms at least a side of the hole through which the input device is located.

5. A portable device according to claim 1 wherein the user input and the front side of the housing lie in a side by side arrangement.

6. A portable electronic device according to claim 5 wherein the front side of the housing and the user input form a continuous front surface of the portable electronic device.

7. A portable electronic device according to claim 1 wherein the battery is located adjacent the engine section in a side by side arrangement.

8. A portable electronic device according to claim 1 further comprising a cut out portion comprising the cut out wherein the cut out portion projects from the rear side of the housing.

9. A portable electronic device according to claim 8 where the camera is partially located in the cut out portion.

10. A portable electronic device according to claim 1 further comprising a door configured to support an electronic module.

11. A portable electronic device according to claim 10 wherein the electronic module is configured to interface to the engine section.

12. A housing for a portable electronic device comprising;
    a one piece housing forming enclosed exterior lateral sides and a rear side;
    a cut out in the rear side of said housing, said cut out configured to receive at least part of a camera;
    wherein the housing is configured to receive a battery and an engine section, wherein the battery and engine section are housed in the housing, and wherein a user input is located in a hole through a front side of the housing.

13. A housing for a portable electronic device according to claim 12 further comprising;
   a front side extending between the lateral edges, said lateral sides and front side forming a aperture configured to receive the user input wherein the user input and the front side of the housing form a continuous front surface of the portable electronic device.

14. A housing according to claim 12 wherein the one piece housing has been extruded.

15. A housing according claim 12 wherein the one piece housing comprises a metal.

16. A housing according to claim 12 wherein the housing has substantially at least one of an open top or bottom aperture.

17. A housing according to claim 16 wherein a antenna module is located at a aperture in the housing.

18. A housing according to claim 17 wherein the antenna module is enclosed by a antenna cover.

* * * * *

UNITED STATES PATENT AND TRADEMARK OFFICE
CERTIFICATE OF CORRECTION

| | |
|---|---|
| PATENT NO. | : 8,953,780 B2 |
| APPLICATION NO. | : 14/067249 |
| DATED | : February 10, 2015 |
| INVENTOR(S) | : Jorgensen |

Page 1 of 1

It is certified that error appears in the above-identified patent and that said Letters Patent is hereby corrected as shown below:

In the claims,

Claim 15, col. 7, line 10 --to-- should be inserted in between "according" and "claim".

Signed and Sealed this
Fifth Day of May, 2015

Michelle K. Lee
*Director of the United States Patent and Trademark Office*